Feb. 26, 1935. W. WEINBERGER 1,992,684
APPARATUS FOR THE EVAPORATION OF CHEMICALS IN ROOMS
Original Filed May 7, 1929
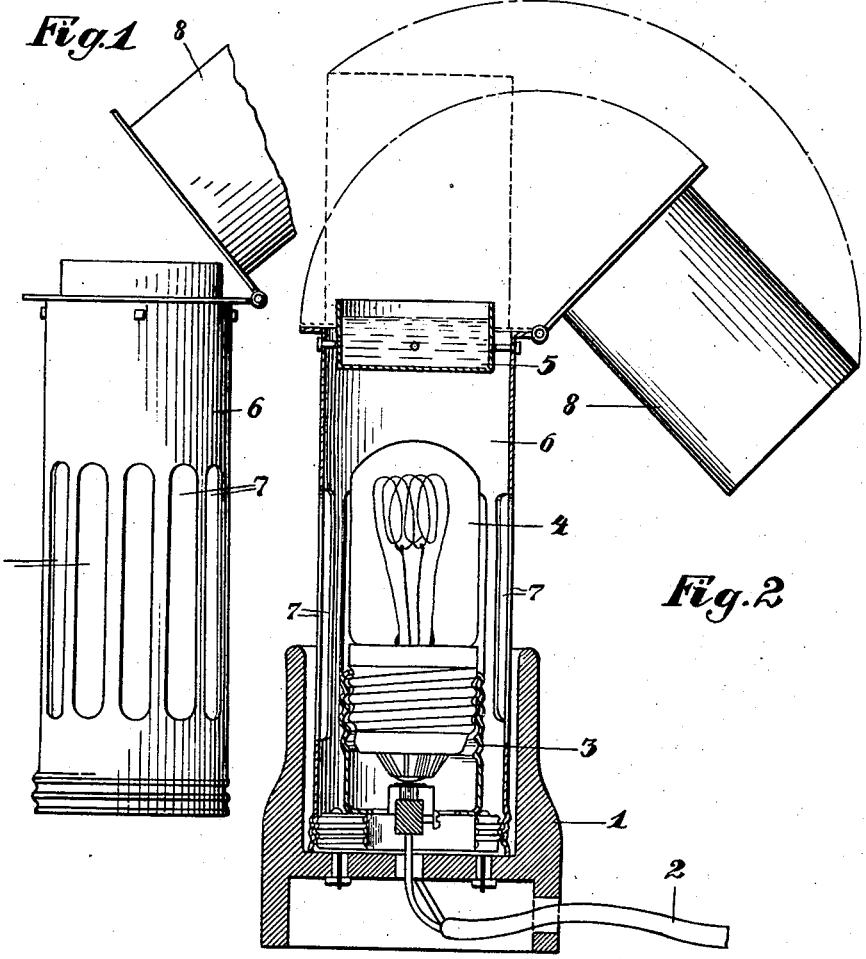
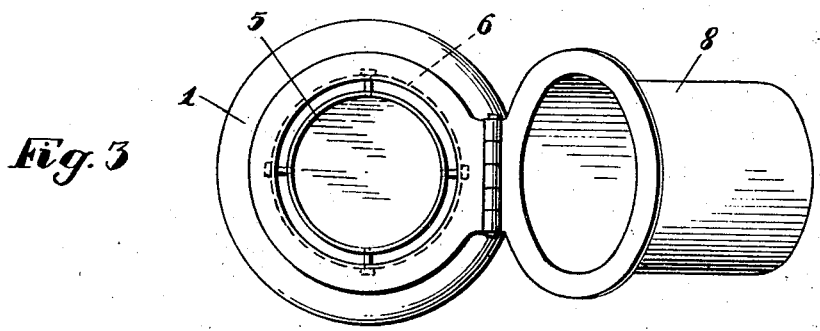
Max Weinberger Patented Feb. 26, 1935

1,992,684

UNITED STATES PATENT OFFICE 1,992,684

APPARATUS FOR THE EVAPORATION OF CHEMICALS IN ROOMS

Max Weinberger, Berlin, Germany

Application May 7, 1929, Serial No. 361,206. Renewed July 19, 1934. In Germany May 15, 1928

1 Claim. (Cl. 128—192)

The evaporation of chemicals in dwelling rooms, preferably for the inhalation of medicaments, supposes that the distribution is fine enough to ensure, on the basis of maximum specific surface, a longest possible duration of the floating state, and that the distribution is sufficiently uniform not to produce irritations by too strong local concentration or to decrease the effects by too weak concentration.

These requirements are not sufficiently considered in the commonly used methods, as for instance heating on a lamp, heating in a pot-like vessel or the like. The distribution of the vapours is effected in an unfavourable manner according to the usual methods by the convection currents existing in the room, and the concentration is locally very strong, as the temperatures, at which the evaporating is carried out, are close to the boiling point of the substances, whereby a strong smoke-like evaporation is effected in a small quantity of air in the form of steam.

According to the invention the source of heat, effecting the heating of the substances to be evaporated, has to fulfill a second task: the production of a directed, very rapidly moving current of hot air of small cross section. A chimney is used, which directs this air current with great ascending force towards the ceiling of the room. The source of heat, preferably an electric heating lamp, is accommodated in this vertical chimney, which encloses the same so narrowly, that the cold air of the room is very rapidly highly heated on the lamp and ascends with great velocity in the chimney. In this manner the duration of the lamp is very considerably increased as excessive heating can never occur.

The hot, rapidly moving, directed air current which is thus produced serves for two purposes: 1.—to transmit the heat of the lamp to the substances to be evaporated, 2.—to throw away from the surface of the substances the vapours which are produced and to convey the same into the upper layers of the air in the room.

With this object in view the substance to be evaporated is accommodated in a cup in the chimney, said cup being situated so that it forms together with the chimney wall a ring-shaped nozzle for the ascending air current. Owing to this nozzle effect the air current draws along the vapour from the chemicals formed on the surface of the substance in the cup according to the saturation pressure of the substance, and admixed intimately with the same so that, in this manner, fresh vapour quantities are formed.

The chemicals can be quantitatively evaporated or volatilized in this manner very favorably much below their boiling point, as by the guiding of the air current and by the conveying of the vapours formed care is taken that the saturation pressure is never attained. The chemicals, which are generally very sensitive against heat, are therefore very carefully evaporated, no excessive boiling of mixtures of substances can take place. It is out of question that smoke particles are drawn along the mixture consisting exclusively of air and vapour. As the concentration of such a mixture is very uniform and moderate a further uniform dilution of the same with the convection currents of the air in the room takes place in the upper air layers of the room. Menthole can be maintained in suspension up to 24 hours long when the windows and doors are closed.

To facilitate filling of the cup in the chimney the upper portion of the chimney is adapted to be laid down around a hinge at the height of the cup.

The desired evaporation temperature determines at which height the cup is mounted in the chimney. This evaporation temperature is preferably below the boiling point of the substance. Experience has shown that a perfect evaporation of menthole boiling at 212° C is obtained when the cup is heated to about 125°.

An embodiment of the invention is illustrated by way of example in the accompanying drawing in which Figure 1 is a view in elevation of the cylindrical body with the chimney shown in partly open position.

Figure 2 is a vertical sectional view partly in elevation showing the apparatus supported on an appropriate base and the chimney in open position in full lines and in closed position in dotted lines.

Figure 3 is a plan view of Figure 2.

In the drawing 1 designates a support for instance of porcelain, 2 the cables for supply of electric current, 3 the socket of the heating lamp, 4 the incandescent electric lamp, 5 the cup, 6 the cylindrical body 7 draft holes for the air sucked in, 8 upper portion of the chimney with the hinge connection with the flange at the upper end of the cylindrical body.

I claim:

An apparatus for evaporating chemicals to provide for the distribution of medicaments in rooms, comprising a cylindrical body closed at the lower end and completely open at the upper end, a source of heat carried by the closed end of the body and terminating materially below the upper open end, the wall of the body substantially throughout the full length of the heating element being formed with an annular series of openings together defining an air inlet of greater area than the area of the solid portion of the body between the openings to provide a relatively large air inlet to admit air through the body throughout substantially the full length of the heating element, a material receiving cup supported at the upper open end of the body and materially above the source of heat, with said cup having a diameter less than that of the open end of the body to define an annular, practically unrestricted passage between the cup and body while freely exposing the sides and bottom of the cup, and a chimney carried by the upper open end of the body and extending thereabove, the chimney having a diameter equaling that of the body for a substantial portion of its length and having a length to provide a positive draft means to insure through the provision of the enlarged air inlet the continuous passage of a large volume of air past the heater into contact with the bottom and side walls of the cup over the surface of the material in the cup and out through the chimney.

MAX WEINBERGER.